Dec. 15, 1959     L. T. AKELEY     2,917,636
FREQUENCY-REGULATED TURBO GENERATOR

Filed June 10, 1957     3 Sheets—Sheet 1

Inventor:
Lloyd T. Akeley
by James E. Mrose
His Attorney

Dec. 15, 1959     L. T. AKELEY     2,917,636
FREQUENCY-REGULATED TURBO GENERATOR

Filed June 10, 1957     3 Sheets-Sheet 2

Inventor:
Lloyd T. Akeley
by James E. Mrose
His Attorney

Inventor:
Lloyd T. Akeley
by James E. Wrose
His Attorney

United States Patent Office 2,917,636
Patented Dec. 15, 1959

2,917,636

FREQUENCY-REGULATED TURBO GENERATOR

Lloyd T. Akeley, Topsfield, Mass., assignor to General Electric Company, a corporation of New York Application June 10, 1957, Serial No. 664,679

9 Claims. (Cl. 290—52)

The present invention relates to frequency-regulated turbo generators and, more particularly, to novel and improved fluid-driven electrical generators wherein electrical output characteristics are accurately governed over extended ranges of fluid flow.

Instrumentation and control of industrial processes at locations remote from reliable sources of electric power have occasioned need for isolated power generating plants, and it has been recognized that in some instances the conditions to be measured or controlled may themselves afford a convenient source of motive energy. This occurs in the case of certain fluid pipelines, for example, where the flowing gaseous or liquid fluid may actuate a suitable turbine which in turn may function as a prime mover for a generator or other allied equipment. While simple unregulated or crudely regulated turbines may prove satisfactory for many purposes, there are others which may demand very precisely uniform output speeds and substantial independence of such speeds in relation to the rate of flow of the actuating fluid. An application involving the latter requirements is that of one form of mass rate flowmeter adapted for use in gas pipelines, it being a requirement of this form of flowmeter that a synchronous electric impeller motor for the flowmeter detector be excited by an alternating current of an unvarying predetermined frequency despite appreciable variations in pipeline flow conditions. Where a fluid turbine in the line is employed to drive an A.-C. electric generator which excites the flowmeter motor, the generator output frequency is subject to deviation and variation which may ultimately be reflected in inaccurate flow measurements, such that only a fluid turbine having a particularly precise speed regulation over extensive flow ranges will suffice.

Accordingly, it is one of the objects of the present invention to provide novel and improved fluid turbine apparatus which sensitively preserves a predetermined rotational speed with high accuracy over extended fluid flow ranges and variable load conditions.

A further object is to provide fluid turbine apparatus having a fast-response speed controller as a component part thereof which imparts improved speed-regulation characteristics.

An additional object is to provide a speed-regulated fluid turbine apparatus wherein a sensitive pneumatic amplifier arrangement closely regulates turbine rotation.

It is another object to provide stable speed-regulated fluid turbine apparatus wherein a swift-acting mechanical regulator automatically introduces stabilizing feedback.

By way of a summary account of this invention in one of its aspects, I provide a generally cylindrical housing adapted to be coupled into a fluid pipeline and having therein an upstream turbine rotor with circularly arranged peripheral blades or buckets coupled in driving relationship to the rotor of a downstream electrical generator. Stationary upstream deflecting vanes direct incoming fluid in one angular sense such that it impinges upon the turbine buckets and occasions turbine rotation in one direction. Without more, the turbine speed and generator output would vary with the fluid flow in the associated pipeline; and in correcting for this deficiency, a plurality of fluid by-pass paths extending through the turbine wheel are provided to enable regulated amounts of the flowing fluid to avoid the turbine buckets when turbine speed tends to become excessive. For the purpose of obtaining high sensitivity and swift response of the regulating apparatus, this assumes the form of a pneumatic cylinder and cooperating slidable piston, with the cylinder having an upstream fluid inlet and an outlet normally at least partly closed by the piston under influence of a bias spring when the turbine speed is at the desired value. The downstream end of the cylinder beyond the piston is normally sealed and becomes exposed to pressures downstream of the turbine wheel only when ports normally closed by weighted and resiliently biased flapper valves are opened responsive to centrifugal forces acting upon the valves. The piston movements achieved by differential pressures appearing across the cylinder inlet and downstream ports are rapid and forceful and operate to vary the by-pass flow through the cylinder outlet, such that a constancy of turbine speed and generator output results. Inherent feedback characteristics of the flapper valve mechanism provide stable operation despite the high gain in the pneumatic unit.

Although the features of this invention which are believed to be novel are set forth in the appended claims, further details of the invention and the objects and advantages thereof may be readily comprehended through reference to the following description taken in connection with the accompanying drawings, wherein:

Figure 2:
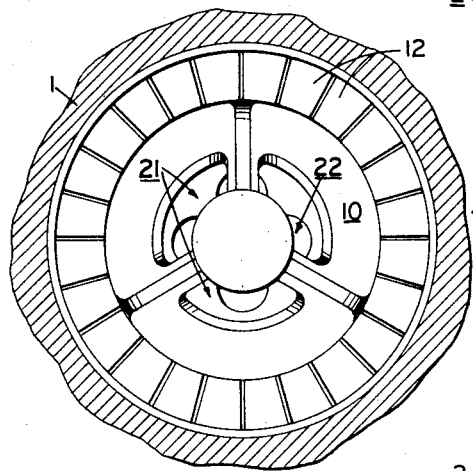
Figure 2 represents a transverse cross-section of the apparatus of Figure 1 taken along the section line 2—2.
Figure 1:
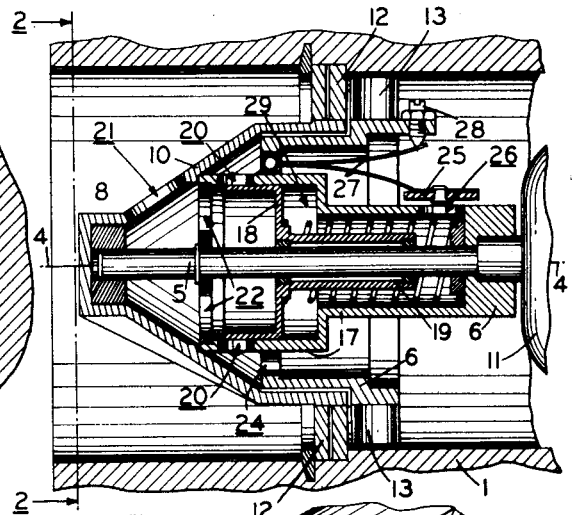
Figure 1 is a sectioned side view of part of one form of regulated turbo generator embodying teachings of this invention.
Figure 3:
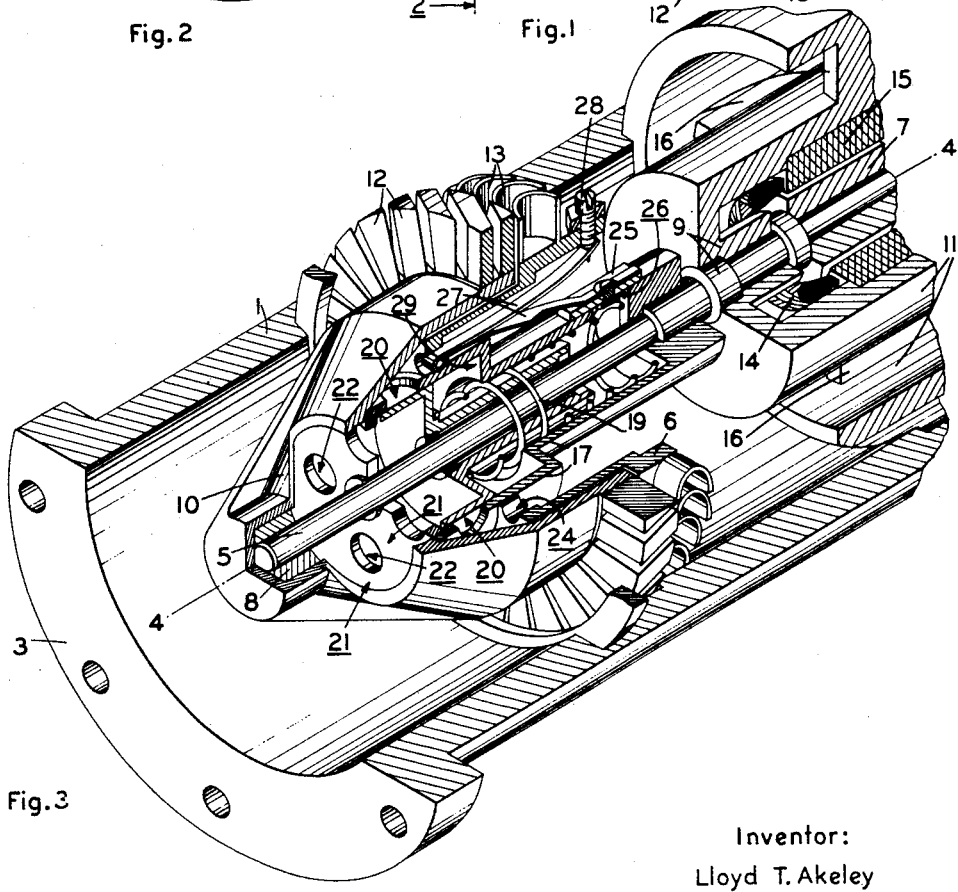
Figure 4:
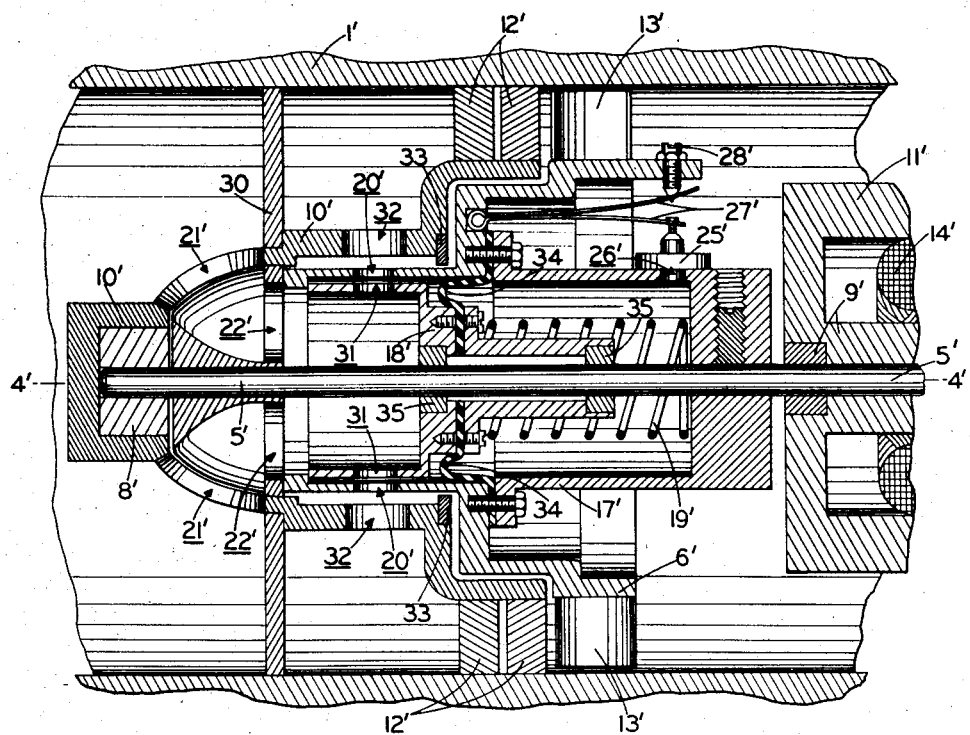
Figure 5:
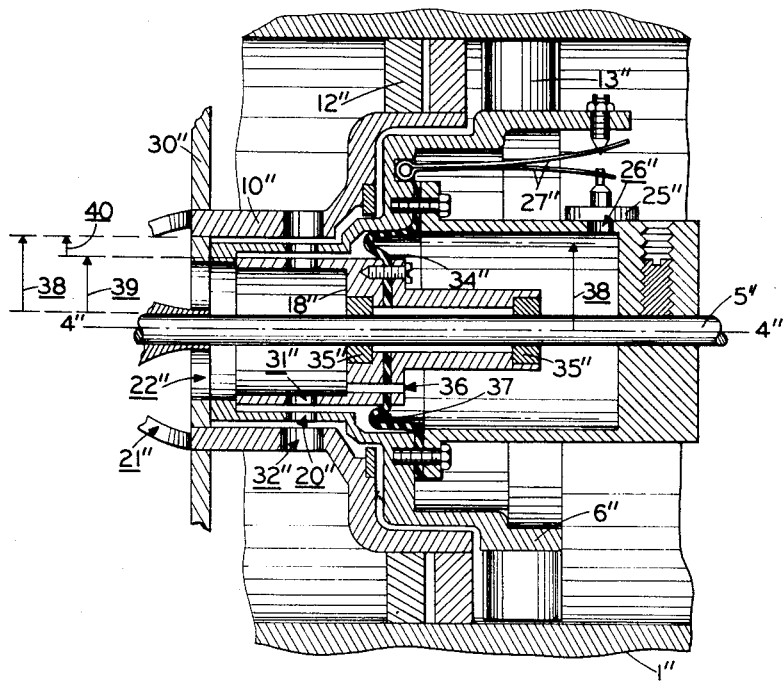

Figure 3 provides a partly cut away isometric view of the apparatus of Figures 1 and 2;

Figure 4 is a sectioned side view of an alternative regulated turbo generator practising teachings of this invention; and Figure 5 is a sectioned side view of another regulating arrangement as embodied in apparatus similar to that of Figure 4.

The arrangement depicted in Figures 1 through 3 includes a generally cylindrical hollow casing 1 adapted for coupling into a fluid pipeline at its upstream and downstream ends, as by way of coupling flanges such as the upstream coupling flange 3 appearing in Figure 3. Within this casing and in alignment with the central longitudinal axis 4—4 thereof is disposed a rotatable shaft 5 which carries a turbine wheel assembly 6 near its upstream end and a diametrically magnetized generator rotor 7 near its downstream end. Shaft 5 is afforded rotational freedom by support bearings 8 and 9 appearing in the upstream and downstream brackets 10 and 11, respectively, both of which are fixed with casing 1. Upstream bracket 10 includes an annular array of skewed fluid-deflecting vanes or nozzles 12 extending radially outward from axis 4—4, the narrow fluid passages therebetween being oriented to direct flowing fluid in one net angular direction about this axis. Fluid leaving the vane array impinges upon turbine buckets 13 which are closely spaced in a cooperating annular assembly on the carrying turbine wheel 6, whereby reaction forces cause spinning of rotor shaft 5 and resultant generation of induced A.-C. electrical signals in the stator windings 14 of the generator stator 15. Downstream bracket 11 is an integral part of the enclosed housing for the generator, and the struts 16 provide the spacing for an annular fluid passageway about the generator such that the fluid may be exhausted downstream while cooling the generator housing.

Neglecting, for the moment, the effects of speed regulating components, it should be clear that as pipeline fluid flow increases and decreases, the turbine rotor shaft will tend to increase and decrease in speed, whereby the frequencies of output signals induced in stator winding 14 by the permanently magnetized rotor 7 will likewise vary. In avoidance of this, an automatically controlled fluid by-pass path is afforded such that critical amounts of the fluid flow may be bled away from paths through the nozzles and turbine buckets as speed exceeds a given value and may be caused to flow through the turbine wheel in a manner tending to decelerate it to the desired rotational speed. In this connection, turbine wheel 6 is shown to include a hollow central cylindrical hub portion 17 which functions as part of an amplifying pneumatic regulator in cooperation with a mating slidable hollow cylindrical piston 18 therein. Biasing spring 19 lightly urges piston 18 toward the illustrated forward position at which its closed side walls completely close the openings 20 through the walls of hub cylinder 17. At such times, by-pass flow of fluid which would otherwise travel through upstream bracket openings 21 and 22, thence through cylinder openings 20, and thence through turbine passages 24 to the downstream outlet, is completely blocked. This blocked condition persists while centrifugally-actuated flapper valves, such as valve 25, maintain the downstream cylinder openings, such as opening 26, in a closed state under influence of adjustable restraining springs, such as spring 27. It will be observed that the valve-restraining spring 27 is of a bifurcated construction with the two leaves thereof spreading apart at their free ends and with their juncture disposed in an accommodating locating recess. One leaf is fixed with the weighted valve member 25 and the other mates with an adjusting screw 28 fitted into the turbine wheel 6 for radial adjustments which will alter the radial spring forces on valve 25. With this construction, the biasing spring occupies little space radially while affording needed high and accurately predetermined restraining forces and while remaining virtually independent of uncertain friction forces often associated with other forms of spring assemblies.

As the turbine wheel is driven above a predetermined speed, the valve 25 rotating with it experiences centrifugal forces proportioned to its weight, and is lifted radially outward against the restraining force of spring 27. The cylinder chamber 29 to the rear of piston 18 then becomes exposed to the relatively low fluid pressures downstream of the turbine buckets 13, through the opening 26 uncovered by the radially deflected centrifugal valve 25, and the differential pressures then existing across the upstream and downstream portions of the apparatus occasion a rapid and positive rearward axial movement of piston 18 against the small biasing force of its spring 19. This action represents an amplification of the force unbalances causing the flapper valve movements; and the sizeable net forces moving piston 18 are further aided by impact forces of the flowing fluid which impinges upon the upstream bottom wall of piston 18.

Rearward axial movement of piston 18 in this manner uncovers the cylinder openings 20 and permits fluid to pass therethrough and through the longitudinal turbine wheel passages 24, thence downstream and out of the housing, in avoidance of the turbine buckets 13. The net flow through nozzles 12 and buckets 13 is thus reduced, which tends to reduce the turbine wheel speed; and, further, as is apparent from Figure 1 the by-pass flow through turbine wheel openings 20 and 24 exerts a drag or damping restraint upon the turbine wheel which aids deceleration. Deceleration occurs because the longitudinal openings occasion angular acceleration of the fluid passing therethrough, with consequent absorption of energy from the turbine wheel by the by-passed fluid. When the turbine wheel has decelerated to the desired predetermined speed, valve 25 closes the downstream cylinder opening 26 and piston 18 slides in the upstream direction to cover more or all of each of the upstream cylinder openings 20 such that by-pass flow is reduced or eliminated. The low biasing forces of spring 19 suffice to return piston 18 to the upstream position once valve 25 closes opening 26 because the pressures on both sides of piston 18 become about equal due to leakage paths around the piston. With equal pressures, and with about the same effective areas on both sides of the piston, there is little net force for the biasing spring 19 to overcome in returning the piston to this position. Sensitivity and regulation are improved because of the low forces which spring 19 must exert. Because of the pneumatic amplification and damping effects, a particularly high speed of response is achieved, and a wide range of flows may be accommodated without appreciable variations in turbine speed and frequency of output of the A.-C. generator.

An additional advantage of this invention is clearly apparent from a consideration of Figure 1. The valve member 25, when the valve member is seated on the hub 17 in closed relationship with the passage on opening 26, is exposed on one side to fluid pressure upstream of the turbine blades and is exposed on its other side to the lower fluid pressure downstream of the turbine blades. The effect is for the differential fluid pressure across the valve member 25 to tend to open the same against the force of the spring 27. However, when the valve member 25 is unseated from the hub 17 to open the passage 26, the pressure drop across the valve is reduced thus effecting an increase in the net closing force on the valve member. This inherent positive feedback stabilizes operation of the valve member 25 and results in improved stability and response of the overall control of fluid flow around the turbine. In one embodiment, wherein the turbine wheel was to be rotated at a predetermined speed of 3600 r.p.m. to yield a 60-cycle per second two-pole generator output, the regulation proved to be within ½ cycle per second over a gaseous flow range of 350 to 1750 pounds per hour with a generator output of about 50 watts.

In the alternative embodiment portrayed in Figure 4, the regulator component regulates the flow of fluid to the nozzles 12′ and turbine buckets 13′, rather than a by-pass flow. For convenience and simplification purposes, those elements corresponding to elements of the apparatus of Figures 1 through 3 are identified by the same reference characters bearing distinguishing single-prime accents. All of the fluid passing through housing 1′ must reach nozzles 12′ and turbine buckets 13′ by first passing through the upstream bracket openings 21′ and 22′, this because of annular upstream sealing wall or partition 30 which extends between bracket 10′ and the housing 1′. Under low flow conditions, when a maximum amount of fluid must be permitted to reach the turbine buckets to cause turbine wheel 6′ to maintain a predetermined speed, the piston 18′ is disposed in the illustrated upstream axial position wherein its side wall openings 31 are in exact registry with the cylinder openings 20′ and upstream bracket openings 32. Fluid thus passes through these openings to the deflecting nozzles with minimum obstruction. A rotating seal formed between turbine 6′ and upstream bracket 10′ by the annular sealing ring 33 confines the fluid flow to the aforesaid course, as does also the flexible diaphragm 34 intermediate pneumatic cylinder 17′ and piston 18′. Increasing turbine wheel speed occasions slight lifting of restrained centrifugal valve 25′ in a manner described earlier herein, whereby the unbalanced pressures on opposite sides of slidable piston 18′ and its associated flexible diaphragm 34 causes axial movement of the piston in a downstream direction. Cylinder openings 20′ thereby become at least partially closed by the side walls of piston 18′, and the quantity of fluid flow to the nozzles and turbine buckets is decreased with attendant reduction of the turbine wheel speed and frequency of A.-C. generator output. Piston 18′ quickly assumes a position at which just enough flow is passed therethrough to maintain the desired predetermined speed. In its operation, this regulated turbine automatically controls itself to maintain a substantially constant turbine speed despite variations either in the load or in the source of fluid pressure.

Flexible diaphragm 34 prevents excessive leakage into the cylinder chamber downstream of piston 18'. However, as was noted in connection with the apparatus of Figures 1 through 3, some access should be provided for transmission of fluid pressures from the upstream to the downstream side of the piston such that upon closing of valve 25' the net forces on the piston will be about equal and the small forces of the spring 19' may return the piston to the illustrated upstream position. The necessary leakage for this purpose may occur about the shaft 5' and the bearings 35 which desirably do not form a tight seal. This leakage for pressure equalization must not be excessive, of course, else the opening of valve 25' will not occasion the sizeable pressure differences on opposite sides of piston 18' and diaphragm 34 which are required to move the piston axially with sufficient rapidity to achieve good speed regulation. Diaphragm 34 insures that this leakage may be kept small, and the area of opening 26' is made larger than the total area of the leakage paths around the piston and diaphragm, with a ratio of 4 to 1 for these areas being an example of a satisfactory relationship in one design.

These effects may be employed advantageously in the elimination of a biasing spring for piston 18' and diaphragm 34. With this spring absent, the responses to pressure differences are desirably enhanced. However, in removing spring 19', the diaphragm and piston relationship should be made such that the product of pressure and effective area downstream is greater than that upstream, whereupon there will result in a net force in the upstream direction tending to urge the piston to the illustrated position in the manner of spring 19'. The arrangement of Figure 5, wherein parts corresponding to those shown in Figure 4 bear the same reference characters with distinguishing double prime accents, is one which does not include a return spring. Instead, the pneumatic amplifier regulator unit is proportioned to yield its own biasing forces in the aforesaid manner. In this connection it will first be observed that the piston 18" and diaphragm 34" are provided with a leakage or pressure-equalizing aperture 36 which may be accurately dimensioned to insure that the desired effects occur. Second, the piston and diaphragm are critically disposed to yield a greater product of pressure and area downstream than upstream. Referring to the downstream side of piston 18" and diaphragm 34", it is noted that the areas transverse to axis 4"—4" over which pressures may be applied to force the piston in the upstream direction lie between the turbine shaft 5" and the bottom 37 of the fold in diaphragm 34", that is, over the radial distance 38. With the valve 25" closed, the pressure effective over this area is the maximum pressure upstream of piston 18", due to the efficacy of communicating opening 36. On the upstream side of piston 18", however, this same maximum upstream pressure can be effective only over the smaller area lying within the radial distance 39, which is less than the radial distance 38. Beyond this, over the area representing the difference between these areas and extending across the radial distance 40, there is exerted a much lower pressure. This lower pressure reflects the many pressure drops experienced by the flowing fluid as it alters course and flows through constricted areas before being communicated to the upstream side of the diaphragm 34". It is thus apparent that the net force exerted is that in the upstream direction and that the piston tends to return to the illustrated position. When valve 25" opens the relatively large cylinder opening 26" under influence of centrifugal forces experienced at speeds beyond a predetermined value, the pressures downstream of piston 18" and diaphragm 34" are quickly lowered to approximate the pressure downstream of the turbine wheel, the relatively small opening 36 then being incapable of equating the downstream pressure to the pressure upstream of piston 18". Accordingly, the piston is moved downstream to exert regulating control.

As will be apparent from the drawings, the feedback feature provided by the valve 25 in the embodiment of Figures 1–3 is also present in the valve member 25' and 25" of Figures 4 and 5. Further, as will be apparent from Figures 4 and 5, the drag or damping restraint resulting from flow through the passages 20 and 24 of the wheel 6 of Figure 1 is also present in the wheels 6' and 6" of Figures 4 and 5 when fluid is flowing through the passages 20', 31 and 20", 31" respectively. However, in the embodiments of Figures 4 and 5, the tendency of the fluid flowing through these openings on the turbine wheel to increase the speed of the turbine occurs when an overspeed condition exists rather than when an underspeed condition exists as in the case of the embodiment of Figure 1. In other words, when the pistons 18', 18" move to reduce the flow to the turbine blades, the flow through the passages 20', 31 and 20", 31" is accordingly reduced thus reducing the absorption of momentum from the turbine wheel and tending to effect an increase in speed thereof. The result is to provide a stabilization of the control of the turbine wheel speed.

It should be understood that while particular embodiments of this invention have been shown and described herein, those skilled in the art may effect various changes, modifications, and substitutions without departing either in spirit or scope from the invention as set forth in the appended claims.

What I claim as new and desire to secure by Letters Patent of the United States is:

1. In a turbine driven device of the type having a casing adapted to conduct fluid, and a turbine wheel within the casing having a plurality of turbine blades: the turbine wheel being provided with a fluid flow passage separate from that provided by the turbine blades with at least a portion of said passage being disposed relative to the axis of the turbine wheel to provide angular acceleration of fluid flowing through said passage about said axis during rotation of the turbine wheel, and means for regulating the speed of the turbine wheel including said passage, a differential fluid pressure actuated first valve member carried by the turbine wheel for movement between an opening and a closing relationship with said passage, and a centrifugal force actuated second valve member carried by the turbine wheel for controlling one of the fluid pressures acting on said first valve responsive to speed of rotation of the turbine wheel.

2. In a turbine driven device of the type having a casing adapted to conduct fluid flow, a turbine wheel rotatably mounted within the casing and having a plurality of turbine blades: the turbine wheel being provided with a fluid flow passage separate from that provided by the turbine blades at least a portion of which is in spaced relation to the axis of the turbine wheel; and means for controlling the flow of fluid through the turbine blades including said passage, a fluid pressure responsive valve member for said passage for controlling the flow of fluid therethrough, means mounting the valve member on the turbine wheel for exposure to fluid pressure upstream and downstream of the turbine wheel and for movement relative to said passage in response to a fluid pressure differential across the valve member, means providing a fluid flow bleed passage across the valve member, and means for controlling the exposure of said valve member to fluid passages downstream of the turbine wheel including a centrifugal force actuated second valve member mounted for resiliently restrained movement in a direction to expose said first valve member to fluid pressure downstream of the turbine wheel in response to rotation of the turbine wheel beyond a predetermined speed.

3. In a turbine driven device having a casing adapted to conduct fluid and a turbine wheel rotatably mounted within the casing and having a plurality of turbine blades; means on the turbine wheel forming a cylinder, the cylinder being provided with a fluid flow inlet passage opening into the casing upstream of the turbine blades and with a fluid flow outlet passage extending generally angularly of the axis of the turbine wheel in flow communication with the inlet passage, a piston in the cylinder mounted for movement between a passage opening and a passage closing position relative to said outlet passage, one side of said piston being in flow communication with said inlet passage, means to expose the other side of said piston to fluid within the casing downstream of the turbine blades including a third passage in the cylinder connecting said other side of the piston with the interior of the casing downstream of the turbine blades, and a centrifugal force actuated valve member closing said third passage and supported on the turbine wheel for resiliently restrained movement in a passage opening direction generally radially outwardly of the turbine wheel.

4. Speed-regulated fluid turbine apparatus comprising a casing adapted to conduct fluid flow, a fluid-driven turbine wheel mounted for rotation within said casing, a load driven by said turbine wheel, a cylinder having a fluid inlet upstream of said turbine wheel and a fluid outlet downstream in relation to said inlet and an opening communicating with fluid downstream of said turbine wheel, said fluid inlet and outlet being disposed in a fluid path the flow through which regulates the amount of fluid available to rotate said turbine wheel, piston means for controlling the flow through said flow path positioned to occasion maximum flows rotating said turbine wheel and mounted within said cylinder intermediate said outlet and opening for slidable axial movements varying the fluid flow through said inlet and outlet and said fluid path, a weighted valve member, and resilient means mounted for rotation with said turbine wheel and resiliently biasing said valve member into closing relationship with said cylinder opening, said valve member being movable by centrifugal force against restraint of said resilient means to open said cylinder opening when said turbine wheel exceeds a predetermined speed of rotation.

5. Speed-regulated fluid turbine apparatus comprising a casing adapted to conduct fluid flow, a fluid-driven turbine wheel mounted for rotation within said casing, a load driven by said turbine, means defining a fluid by-pass path through the turbine wheel for directing fluid from positions upstream to positions downstream in relation to said turbine wheel, means movable responsive to differences in fluid pressures upstream and downstream of said turbine wheel to control fluid flow through said by-pass path, means urging the movable means to a position at which said movable means substantially blocks fluid flow through said by-pass path, and centrifugally-actuated means responsive to rotation of said turbine wheel to render said movable means substantially insensitive to said pressure differences when said turbine speed falls below a predetermined value.

6. Speed-regulated fluid turbine apparatus comprising a casing adapted to conduct fluid flow, a fluid-driven turbine wheel mounted for rotation within said casing about an axis, a load driven by said turbine, means providing passages through said turbine wheel radially spaced from said axis and defining a fluid by-pass path for directing fluid from positions upstream to positions downstream in relation to said turbine wheel, means movable responsive to differences in fluid pressures upstream and downstream of said turbine wheel to control fluid flow through the by-pass path, means urging said movable means to a position at which said movable means substantially blocks fluid flow through said by-pass path, centrifugal force-actuated valve means rotatable with said turbine wheel and operative in one position to isolate said movable means from fluid pressure downstream of said turbine, and resilient means urging said valve means to said one position, said valve means being movable by centrifugal force from said one position against restraint of said resilient means to permit response of said movable means to said differential pressures.

7. Speed-regulated fluid turbine apparatus comprising a casing adapted to conduct fluid flow, a fluid-driven turbine wheel mounted for rotation within said casing about an axis, a load driven by said turbine, a cylinder rotatable with said turbine wheel about said axis having a fluid inlet upstream of said turbine wheel and a fluid outlet downstream of said inlet and an opening communicating with fluid downstream of said turbine wheel, piston means mounted within said cylinder intermediate said outlet and opening for slidable axial movements which open and close said fluid outlet, means urging said piston means to a position at which said piston means closes said fluid outlet, means defining a fluid by-pass path communicating fluid from said fluid outlet to positions downstream in relation to said turbine wheel, and centrifugally-actuated valve means tending to close said cylinder opening and rotatable with said turbine to open said cylinder opening when said turbine wheel exceeds a predetermined speed.

8. Speed-regulated fluid turbine apparatus comprising a casing adapted to conduct fluid flow, a fluid-driven turbine wheel mounted for rotation within said casing about an axis and having at least one longitudinal fluid passage therethrough parallel with said axis at a radial distance therefrom, an alternating current electric generator within said casing downstream of said turbine having a permanently magnetized rotor driven by said turbine wheel, a cylinder rotatable with said turbine wheel about said axis having a fluid inlet upstream of said turbine wheel and a fluid outlet downstream of said inlet and an opening communicating with fluid downstream of said turbine wheel, piston means mounted within said cylinder intermediate said fluid outlet and opening for slidable axial movements tending to open and close said fluid outlet responsive to differences between fluid pressures upstream and downstream of said turbine wheel, means urging said piston means to a position at which said piston means substantially closes said fluid outlet, means defining a fluid by-pass path communicating fluid from said fluid outlet to said longitudinal passage in the turbine wheel, a valve member disposed for opening and closing said cylinder opening, and resilient means mounted on said turbine wheel holding said valve member angularly fixed about said axis and resiliently urging said valve member radially into closing relationship with said cylinder opening, said valve member being movable by centrifugal force against restraint of said resilient means to open said cylinder opening when said turbine wheel exceeds a predetermined speed of rotation.

9. In a turbine driven device having a casing adapted to conduct fluid and a turbine wheel rotatably mounted within the casing having a plurality of turbine blades; the turbine wheel being provided with a fluid by-pass passage for directing fluid flowing through the casing around the turbine blades, a valve mounted coaxially on the turbine wheel, the valve having a cylindrical chamber and a pair of spaced apart openings communicating with said chamber, with said chamber and openings forming a portion of said by-pass passage and with one of said openings being disposed for communication with fluid within the casing upstream of the turbine wheel, a piston slidably mounted within the chamber for movement in response to a fluid pressure differential across the valve and cooperating with the other opening of said pair of openings to regulate the flow of fluid therethrough, said pair of openings being disposed on the same side of the piston, means forming a fluid bleed passage around the piston, the valve further being provided with a third opening for said chamber of greater flow capacity than said bleed passage and disposed on the opposite side of the piston from said pair of openings for directing fluid from within the chamber to the interior of the casing externally of the valve and downstream of the turbine wheel, a centrifugal force actuated valve member for opening and closing said third opening disposed externally of the valve, and means mounting said valve member on the turbine wheel for resiliently restrained movement between a first position wherein the valve member is seated on said valve in closing relationship with said third opening to provide equal pressures on opposite sides of said piston and a second position wherein said valve member is spaced radially outwardly of the valve in opening relationship with said third opening to provide a fluid pressure differential across said piston so as to effect movement thereof relative to said other of said pair of openings.

References Cited in the file of this patent

UNITED STATES PATENTS

| | | |
|---|---|---|
| 806,154 | Lombard | Dec. 5, 1905 |
| 1,002,669 | Gelpke | Sept. 5, 1911 |
| 1,035,116 | Gelpke | Aug. 6, 1912 |
| 1,202,310 | Pfau | Oct. 24, 1916 |
| 1,309,808 | Pfau | July 15, 1919 |
| 1,704,403 | Nash | Mar. 5, 1929 |
| 1,751,982 | Dunham | Mar. 25, 1930 |
| 2,308,135 | White | Jan. 12, 1943 |
| 2,642,543 | Teague et al. | June 16, 1953 |